United States Patent
Park et al.

(10) Patent No.: US 10,281,149 B2
(45) Date of Patent: May 7, 2019

(54) REVERSE FLOW PREVENTION APPARATUS FOR COMMON EXHAUST FLUE AND COMBUSTION APPARATUS HAVING SAME

(71) Applicant: Kyungdong Navien Co., Ltd., Pyeongtaek, Gyeonggi-Do (KR)

(72) Inventors: Jun Kyu Park, Incheon (KR); Duck Sik Park, Gyeonggi-do (KR)

(73) Assignee: Kyungdong Navien Co., Ltd., Pyeongtaek, Gyeonggi-do (KR)

( * ) Notice: Subject to any disclaimer, the term of this patent is extended or adjusted under 35 U.S.C. 154(b) by 405 days.

(21) Appl. No.: 15/165,242

(22) Filed: May 26, 2016

(65) Prior Publication Data

US 2016/0265768 A1    Sep. 15, 2016

Related U.S. Application Data

(63) Continuation of application No. PCT/KR2014/010886, filed on Nov. 13, 2014.

(30) Foreign Application Priority Data

Dec. 5, 2013 (KR) .......................... 10-2013-0150615

(51) Int. Cl.
*F23J 13/06* (2006.01)
*F23J 11/02* (2006.01)
(Continued)

(52) U.S. Cl.
CPC .............. *F23J 11/02* (2013.01); *F23J 13/04* (2013.01); *F23L 11/00* (2013.01); *F23L 13/02* (2013.01); *F23L 13/06* (2013.01); *F23J 2213/70* (2013.01)

(58) Field of Classification Search
CPC .... F16L 37/252; E03C 1/0401; E03C 1/0403; E03C 1/06; F23J 13/04; F23J 15/003;
(Continued)

(56) References Cited

U.S. PATENT DOCUMENTS

| RE33,084 E | * | 10/1989 | Ranson ................. B65G 53/30 406/50 |
| 2009/0235916 A1 | * | 9/2009 | Rossetti ................ F16K 15/038 126/292 |

FOREIGN PATENT DOCUMENTS

| DE | 19906736 C1 | * | 12/2000 | ............... F23J 13/08 |
| JP | 2002021269 A | * | 1/2002 | |
| KR | 10-0211103 B1 | | 7/1999 | |

* cited by examiner

*Primary Examiner* — Jason Lau
(74) *Attorney, Agent, or Firm* — Mintz Levin Cohn Ferris Glovsky and Popeo, P.C.; Kongsik Kim; Jhongwoo Jay Peck (57) ABSTRACT

The present invention relates to a reverse flow prevention apparatus for common exhaust flue and a combustion apparatus having same. The reverse flow prevention apparatus for common exhaust flue, which is configured to collect exhaust gas of a plurality of combustion apparatuses, discharge the collected exhaust gas through a common exhaust flue, and prevent a reverse flow of the exhaust gas from the common exhaust pipe to each of the combustion apparatuses, includes a flange coupled to an exhaust port of each of the combustion apparatuses, an opening and closing apparatus hinge-coupled to an upper part of the flange to be opened and closed by a pressure difference between a lower portion and an upper portion thereof, and a body coupled to the upper part of the flange so as to accommodate the opening and closing apparatus. In accordance with the present invention, the reverse flow prevention apparatus, which may be directly installed at the exhaust port of the combustion apparatus, is coupled to the common exhaust flue upon installation thereof so that a separate certification may not be required to reduce time and costs for a certification.

7 Claims, 9 Drawing Sheets

(51) Int. Cl.
*F23L 11/00* (2006.01)
*F23L 13/02* (2006.01)
*F23L 13/06* (2006.01)
*F23J 13/04* (2006.01)

(58) Field of Classification Search
CPC ........ F23J 15/022; F23J 15/04; F23J 2219/10;
F23J 15/00; F23J 15/006; F23J 2215/10;
F23J 2217/101; F23J 15/02; F23J 15/025;
F23J 2215/50; F23J 2217/104; F23J
2217/105; F23J 2217/20; F23J
2900/15004; F23J 2900/15061; A62C
2/12; F16K 15/00
See application file for complete search history.

REVERSE FLOW PREVENTION APPARATUS FOR COMMON EXHAUST FLUE AND COMBUSTION APPARATUS HAVING SAME

CROSS-REFERENCE TO RELATED APPLICATIONS

This is a continuation application of International Application No. PCT/KR2014/010886 filed on Nov. 13, 2014, which claims priority to Korean Application No. 10-2013-0150615 filed on Dec. 5, 2013. The applications are incorporated herein by reference.

TECHNICAL FIELD

The present invention relates to a reverse flow prevention apparatus for common exhaust flue and combustion apparatus having same, and more particularly, to a reverse flow prevention apparatus for common exhaust flue to be usable without a separate certification by integrally providing a reverse flow prevention apparatus preventing a reverse flow of exhaust gas to a combustion apparatus in a cascade system which commonly exhausts gas from a plurality of combustion apparatuses through a single exhaust flue, and a combustion apparatus having same.

BACKGROUND ART

Generally, a combustion apparatus including a boiler and a water heater having an internal circulation apparatus may be solely used, or compact combustion apparatuses may be connected in parallel with each other to configure a cascade system capable of having a capacity comparable with that of a large combustion apparatus.

Such a cascade system including a plurality of combustion apparatuses has advantages in which an installing at a limited space may be possible in comparison with a large combustion apparatus, a maintenance and a management may be easy, the cost of fuel may be reduced by operating some of the combustion apparatuses when a load is small and by additionally operating the rest of the combustion apparatuses as much as a required quantity of heat when the load is increased to require an increase of quantity of heat.

The cascade system using the plurality of combustion apparatuses may have a simplified exhaust pipe configuration using a common exhaust pipe. In other words, an exhaust flue connecting exhaust ports of the plurality of combustion apparatuses in parallel is used.

When such a common exhaust flue is used, gas discharged through the common exhaust flue may be flow reversely inside the combustion apparatus which has been stopped, and also a problem in which condensate water resulting from a condensation of vapor contained in the exhaust gas flows reversely may occur. The exhaust gas flowing inside the combustion apparatus flows into an indoor space. The reason is that the combustion apparatus has a configuration using a ventilator and the ventilator ventilates air inside the indoor space such that an inside of the combustion apparatus and the indoor space are actually in communication with each other.

With reference to the accompanying drawings, a configuration example of a typical combustion apparatus using a common exhaust flue will be described below.

Figure 1:
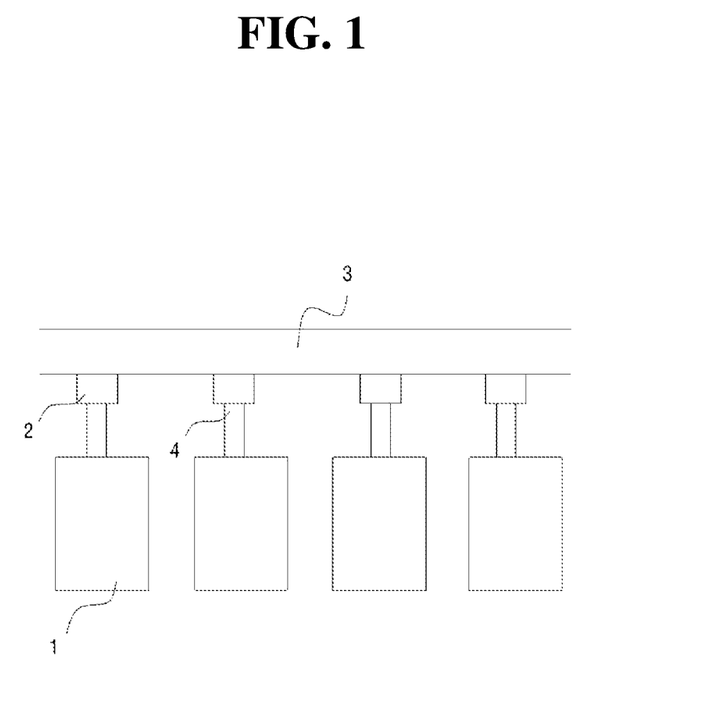
FIG. 1 is a configuration diagram of a cascade system using a typical reverse flow prevention apparatus for common exhaust flue.

FIG. 1 is a block diagram of a cascade system using a typical common exhaust flue.

With reference to FIG. 1, a typical cascade system is configured to include a plurality of combustion apparatuses 1, a reverse flow prevention portion 2 connected to an exhaust connection port 4 of each of the plurality of combustion apparatuses 1, and a common exhaust portion 3 discharging exhaust gas selectively discharged from each combustion apparatus 1 to an outside.

One side of the reverse flow prevention portion 2 is connected to the common exhaust portion 3, and the other side thereof is connected to the exhaust connection port 4 of the combustion apparatus 1.

As described above, the cascade system using the typical common exhaust flue includes the common exhaust portion 3 coupled to a plurality of reverse flow prevention portions 2 separated from the combustion apparatus 1, and has a configuration in which the exhaust connection port 4 of the combustion apparatus 1 is coupled to each of the reverse flow prevention portions 2.

A case of the reverse flow prevention portion 2 and the common exhaust portion 3 are generally formed with a polypropylene material having a relatively high hardness through a mold, and the reverse flow prevention portion 2 and the common exhaust portion 3 are manufactured by the same manufacturer to be supplied by being integrally coupled to each other.

Meanwhile, the common exhaust portion 3 may be certified in terms of a material, thermal resistance, durability, and the like. As described above, since the reverse flow prevention portion 2 is manufactured by a manufacturer the same as that of the common exhaust portion 3 and is supplied by being integrally coupled thereto, the reverse flow prevention portion 2 should be certified together with the common exhaust portion 3 so that a certification procedure may cause an inconvenience and a problem in an increase of time and costs may occur.

Also, in North America, it is permitted that a user purchases a relatively inexpensive polyvinyl chloride (PVC) pipe to use the PVC pipe as the common exhaust portion 3. As described above, however, since the reverse flow prevention portion 2 and the common exhaust portion 3 are manufactured by the same manufacturer to be supplied by being integrally coupled to each other, there is a problem in which a user residing in North America cannot afford to purchase a PVC pipe to use it as the common exhaust portion 3 of a cascade system excepting that a single combustion apparatus 1 is provided and thus the reverse flow prevention portion 2 is not required to allow the user to purchase the PCV pipe to use it as an exhaust flue.

Figure 2:
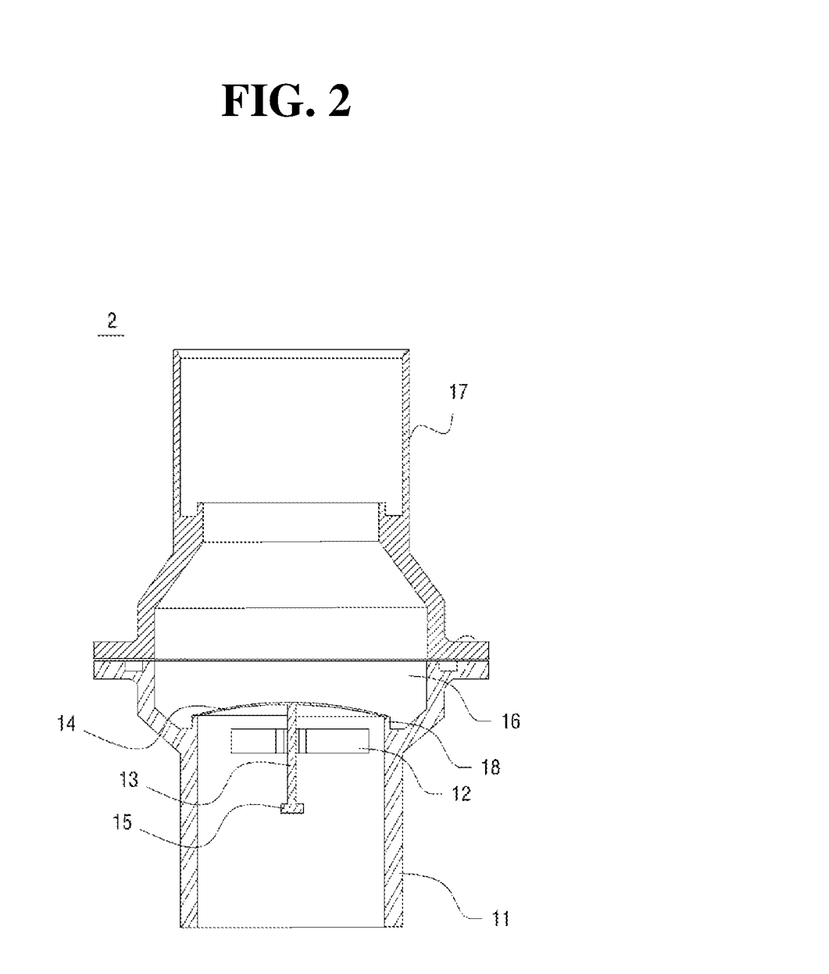
FIGS. 2 and 3 are cross-sectional configuration diagrams of the typical reverse flow prevention apparatus for common exhaust flue.
Figure 3:
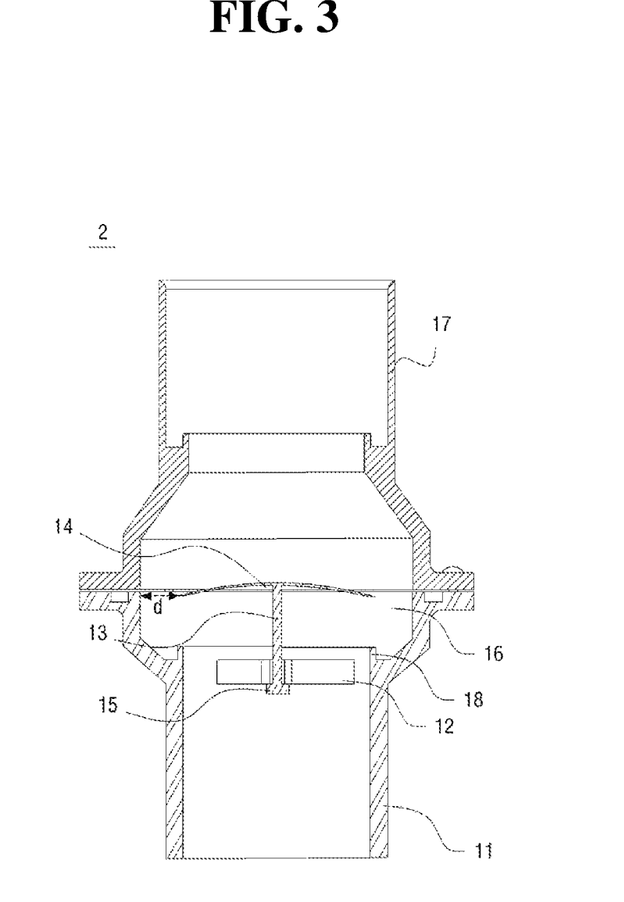

FIGS. 2 and 3 are cross-sectional views illustrating a closing state and an opening state of the reverse flow prevention portion 2, respectively.

With reference to FIGS. 2 and 3 respectively, the typical reverse flow prevention portion 2 may be configured to include a first pipe 11 coupled to the exhaust connection port 4 of the combustion apparatus 1; a fixing member 12 provided at an inward center portion of the first pipe 1; a movable shaft 13 inserted into the fixing member 12 to be movable vertically; an opening and closing member 14 having a predetermined area, provided at an upper part of the movable shaft 13, and vertically moved according to a pressure difference between an upper part of the first pipe 11 and a lower part thereof to close the upper part thereof when having been moved in a downward direction; an escape prevention portion 15 provided at a lower end of the movable shaft 13 to prevent the movable shaft 13 from being escaped from the fixing member 12 in an upward direction; a second pipe 16 having a diameter greater than that of the first pipe 11 and provided at an upper side of the first pipe 11 to provide a space through which exhaust gas is discharged against the opening and closing member 14 when the opening and closing member 14 is moved in the upward direction; and a third pipe 17 extending from the second pipe 16 in the upward direction to be coupled to the common exhaust portion 3.

A protrusion sealing portion 18 protruding from the upper part of the first pipe 11 to come in contact with a lower edge of the opening and closing member 14 while the opening and closing member 14 has been closed is included.

In such a configuration, when the combustion apparatus 1 connected to a lower side of the first pipe 11 does not operate, a pressure of the common exhaust portion 3 through which exhaust gas is discharged is high due to an operation of other combustion apparatus 1, such that an internal pressure of the third pipe 17 becomes higher than that of the first pipe 11.

Consequently, as shown in FIG. 2, the opening and closing member 14 is moved in the downward direction and the lower edge thereof comes in contact with an upper part of the protrusion sealing portion 18 to close the upper part of the first pipe 11, thereby preventing a reverse flow of the exhaust gas flowing through the first pipe 11 into the combustion apparatus 1 located at the lower side of the first pipe 11.

Also, when the combustion apparatus 1 connected to the first pipe 11 operates, exhaust gas is discharged from the combustion apparatus 1 and thus the internal pressure of the first pipe 11 becomes higher than that of the third pipe 17 to push up the opening and closing member 14 in the upward direction.

When the opening and closing member 14 is upwardly moved inside the second pipe 16, the exhaust gas discharged through the first pipe 11 is discharged to the outside through a space between the opening and closing member 14 and the second pipe 16 along the third pipe 17 and the common exhaust portion 3.

As described above, the reverse flow prevention portion 2 applied to the cascade system using the typical common exhaust flue may perform an exhaust and a reverse flow prevention of the exhaust gas using a simplified configuration, but there is a problem in increasing a volume of the reverse flow prevention portion 2 because the second pipe 16 having a diameter greater than that of the first pipe 11 should be employed.

Also, since the opening and closing member 14 is vertically moved, a total area of the opening and closing member 14 nearly occludes the second pipe 16 so that it may cause a problem in which a discharge space defined by 'd' in FIG. 3 may be narrow to interrupt a smooth exhaust.

In addition, the opening and closing member 14 and the protrusion sealing portion 18, which are made of a plastic material, come in contact with each other to serve as a preventer of a reverse flow of the exhaust gas, so that there is a problem in which a complete occlusion of the reverse flow of the exhaust gas is difficult due to an insufficient sealing ability between plastics.

Moreover, upon an exhaust operation, condensate water resulting from a condensation of vapor contained in the exhaust gas may flow into the combustion apparatus 1 through the third pipe 17, the second pipe 16, and the first pipe 11, so that there is a problem in which a condensate water discharge apparatus including a siphon for discharging such condensate water should be separately provided.

SUMMARY

Therefore, an object of the present invention is to provide a reverse flow prevention apparatus for a common exhaust flue capable of enabling a user to purchase an inexpensive common exhaust flue made of a PVC material with no need of a separate certification, and a combustion apparatus having same.

Also, another object of the present invention is to provide a reverse flow prevention apparatus for a common exhaust flue, which does not need to unnecessarily increase a pipe diameter so as to discharge exhaust gas and is able to increase an exhaust area compared to the related art, and a combustion apparatus having same.

In addition, still another object of the present invention is to provide a reverse flow prevention apparatus for a common exhaust flue capable of not only improving a sealing ability to completely block a reverse flow of exhaust gas but also preventing a reverse flow of condensate water resulting from a condensation of vapor contained in the exhaust gas from flowing inside a combustion apparatus, and the combustion apparatus having same.

To address the problems described above, a reverse flow prevention apparatus for a common exhaust flue of the present invention, which is configured to collect exhaust gas of a plurality of combustion apparatuses, discharge the collected exhaust gas through a single common exhaust flue, and prevent a reverse flow of the exhaust gas from the single common exhaust flue to each of the combustion apparatuses, includes a flange coupled to an exhaust port of each of the combustion apparatuses, an opening and closing apparatus hinge-coupled to an upper part of the flange to be opened and closed by a pressure difference between a lower portion and an upper portion thereof, and a body coupled to the upper part of the flange so as to accommodate the opening and closing apparatus.

Also, a combustion apparatus includes a reverse flow prevention apparatus for a common exhaust flue, wherein the reverse flow prevention apparatus includes a flange coupled to an exhaust port of the combustion apparatus, an opening and closing apparatus hinge-coupled to an upper part of the flange to be opened and closed by a pressure difference between a lower portion and an upper portion thereof, and a body coupled to the upper part of the flange so as to accommodate the opening and closing apparatus, and the reverse flow prevention apparatus is coupled to an exhaust connection port of the combustion apparatus.

In the reverse flow prevention apparatus for a common exhaust flue and the combustion apparatus having same of the present invention, the reverse flow prevention apparatus is manufactured by a manufacturer of the combustion apparatus in a state of being coupled thereto and is connected to a common exhaust flue when being installed. Therefore, a user may purchase an inexpensive common exhaust flue made of a PVC material to improve a user convenience. Also, by integrally manufacturing the reverse flow prevention apparatus with an exhaust port of the combustion apparatus, a separate certification may not be required to reduce time and costs for a certification.

In addition, according to the present invention, an opening and closing member rotated by a hinge is used so that an installation space may be minimized without an unnecessary increase of a pipe diameter and also an exhaust area may be increased to improve exhaust efficiency.

Moreover, in accordance with the present invention, a sealing portion made of an elastic material coming in contact with the opening and closing member is used to improve a sealing ability, thereby increasing a reverse flow prevention effect of exhaust gas. In addition, in accordance with the present invention, a configuration for collecting and discharging condensate water condensed at the common exhaust flue is included inside the reverse flow prevention apparatus, so that the condensate water is prevented from flowing inside the combustion apparatus with such a simplified configuration.

DESCRIPTION OF REFERENCE NUMERALS

100: Reverse flow Prevention Apparatus for Common Exhaust Flue
110: Flange
111: Water Collector 112: Connection Pipe
113: Exhaust Hole 114: Airtight Member
115: Sealing Portion 116: Discharge Pipe
117: Inclined Protrusion 118: Hinge Coupler
120: Opening and Closing Apparatus 121: Opening and Closing Member
122: Hinge 130: Body
131: Stopper 132: Spacing Portion
133: Slit Coupling Portion 134: Clamp
140: Common Exhaust Connection Flue 200: Combustion Apparatus
210: Exhaust Connection Port 300: Common Exhaust Flue

DETAILED DESCRIPTION

Hereinafter, with reference to the accompanying drawings, a reverse flow prevention apparatus for common exhaust flue and a combustion apparatus having same in accordance with the present invention will be described in detail.

Figure 4:
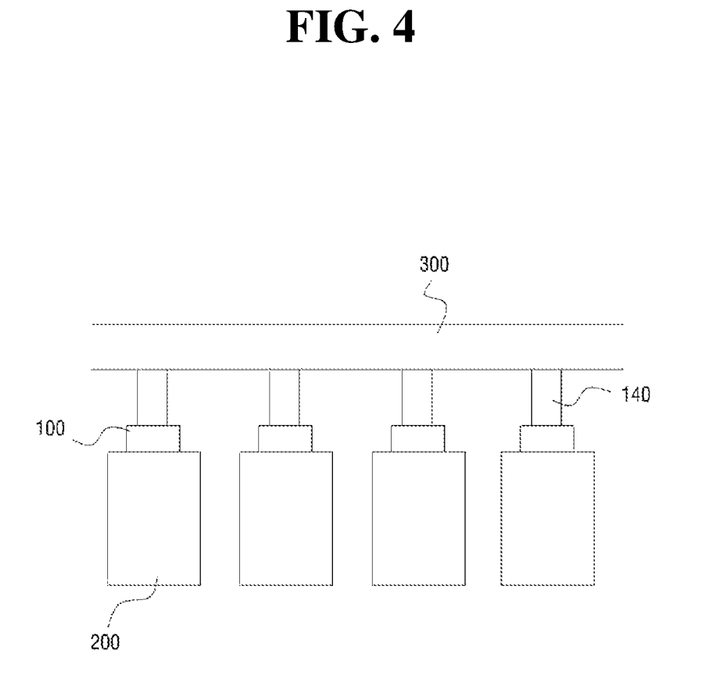
FIG. 4 is a configuration diagram of a cascade system using a reverse flow prevention apparatus for common exhaust flue according to the present invention.
Figure 5:
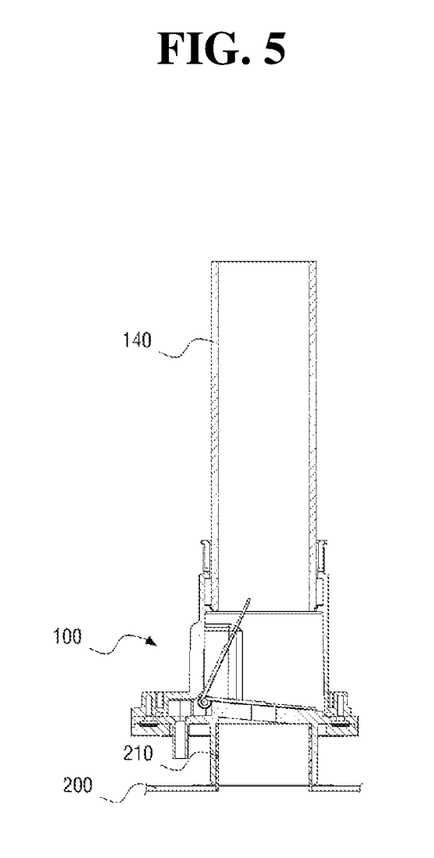
FIG. 5 is a cross-sectional configuration diagram illustrating a coupled state between the reverse flow prevention apparatus for common exhaust flue according to a preferred embodiment of the present invention and an exhaust connection port of a combustion apparatus.

FIG. 4 is a configuration diagram of a cascade system using a reverse flow prevention apparatus for common exhaust flue according to the present invention, and FIG. 5 is a cross-sectional configuration diagram illustrating a coupled state between the reverse flow prevention apparatus for common exhaust flue according to a preferred embodiment of the present invention and an exhaust connection port of a combustion apparatus.

With reference to FIGS. 4 and 5 respectively, a reverse flow prevention apparatus 100 for common exhaust flue according to a preferred embodiment of the present invention is supplied by being coupled to an exhaust connection port 210 of a combustion apparatus 200.

A common exhaust flue 300 and the reverse flow prevention apparatus 100 for a common exhaust flue are coupled to each other through a common exhaust connection pipe 140.

In a typical reverse flow prevention apparatus integrally configured with the common exhaust flue 300, it should be certified in terms of a material, thermal resistance, durability, and the like together with the common exhaust flue 300. On the other hand, if the reverse flow prevention apparatus 100 for a common exhaust flue is supplied in a state of being coupled to the exhaust connection port 210 of the combustion apparatus 200, a manufacturer of the combustion apparatus 200 should take responsibility for the reverse flow prevention apparatus 100 so that a separate certification is not needed.

Consequently, there is no need to perform an inconvenient procedure for obtaining a certification, so that time and costs for the certification may be reduced.

Also, since the reverse flow prevention apparatus 100 for a common exhaust flue is directly coupled to the combustion apparatus 200, when a user is allowed to directly purchase and install the common exhaust flue 300 as in North America, the user may replace it with an inexpensive common exhaust flue 300 of a PVC material so that a user convenience may be improved.

Figure 6:
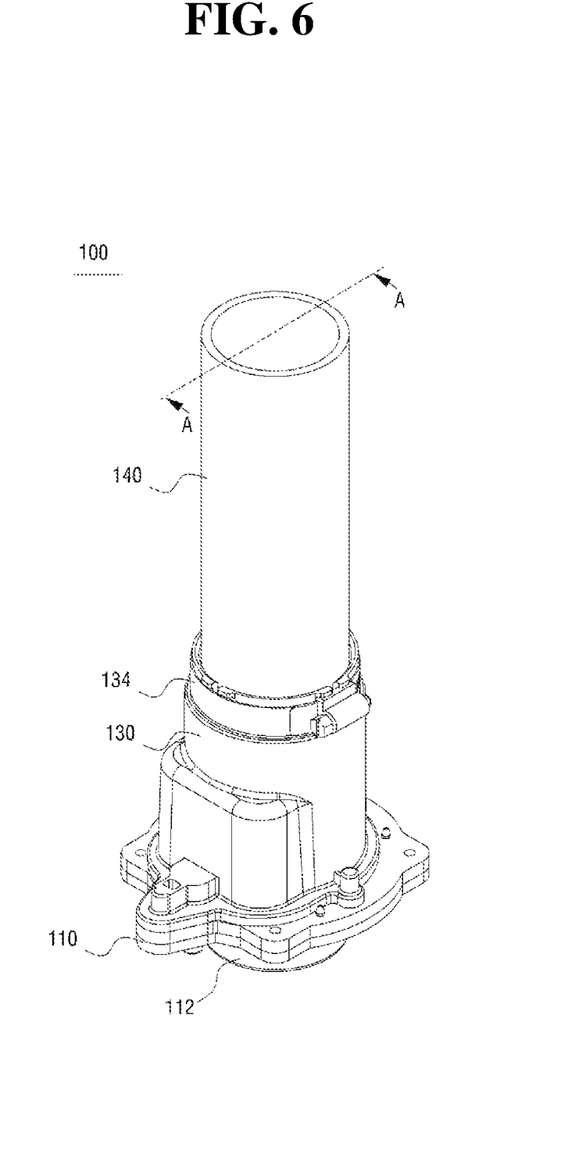
FIG. 6 is a perspective view illustrating the coupled state of the reverse flow prevention apparatus for common exhaust flue according to the preferred embodiment of the present invention.
Figure 7:
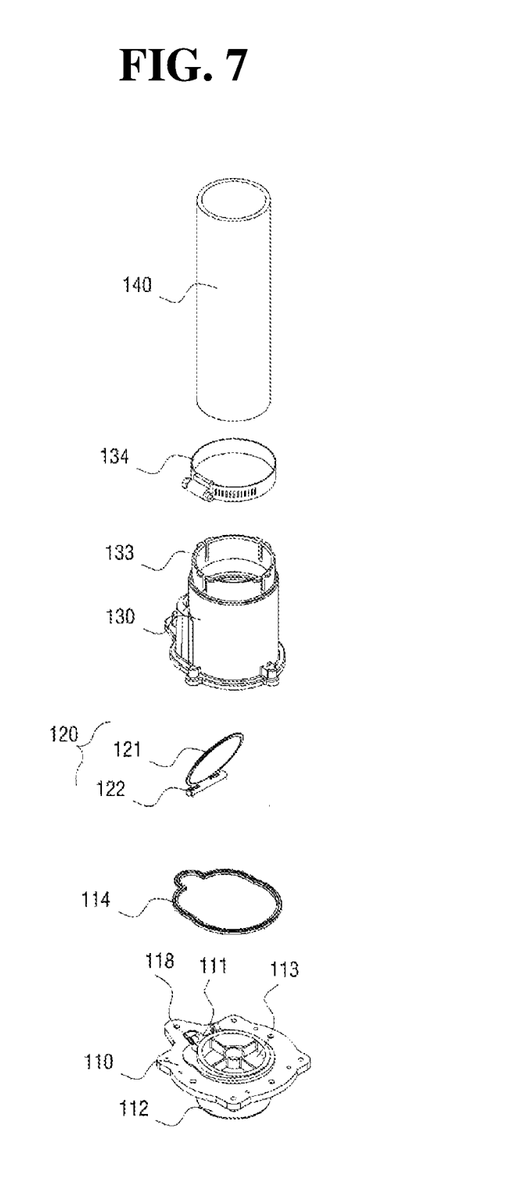
FIG. 7 is an exploded perspective view of the reverse flow prevention apparatus for common exhaust flue according to the preferred embodiment of the present invention.
Figure 8:
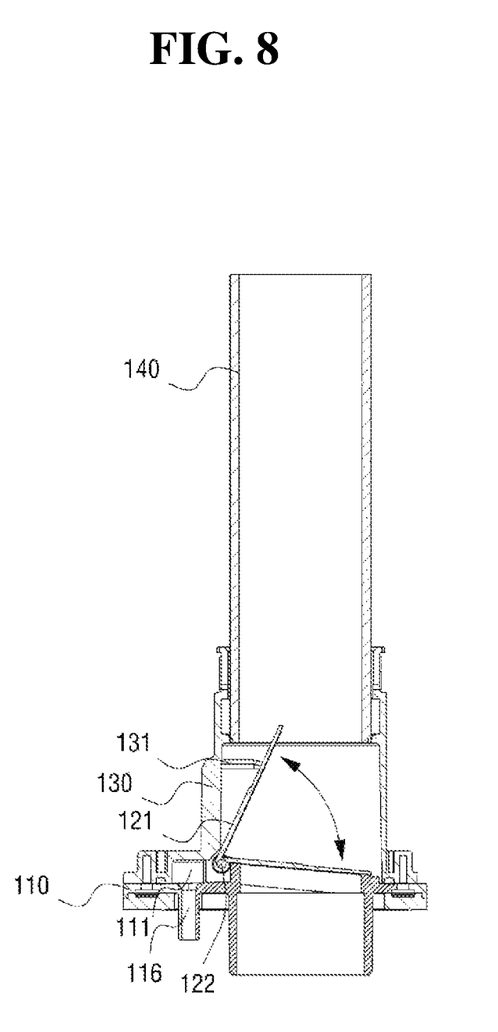
FIG. 8 is a cross-sectional view taken along line A-A of FIG. 6.
Figure 9:
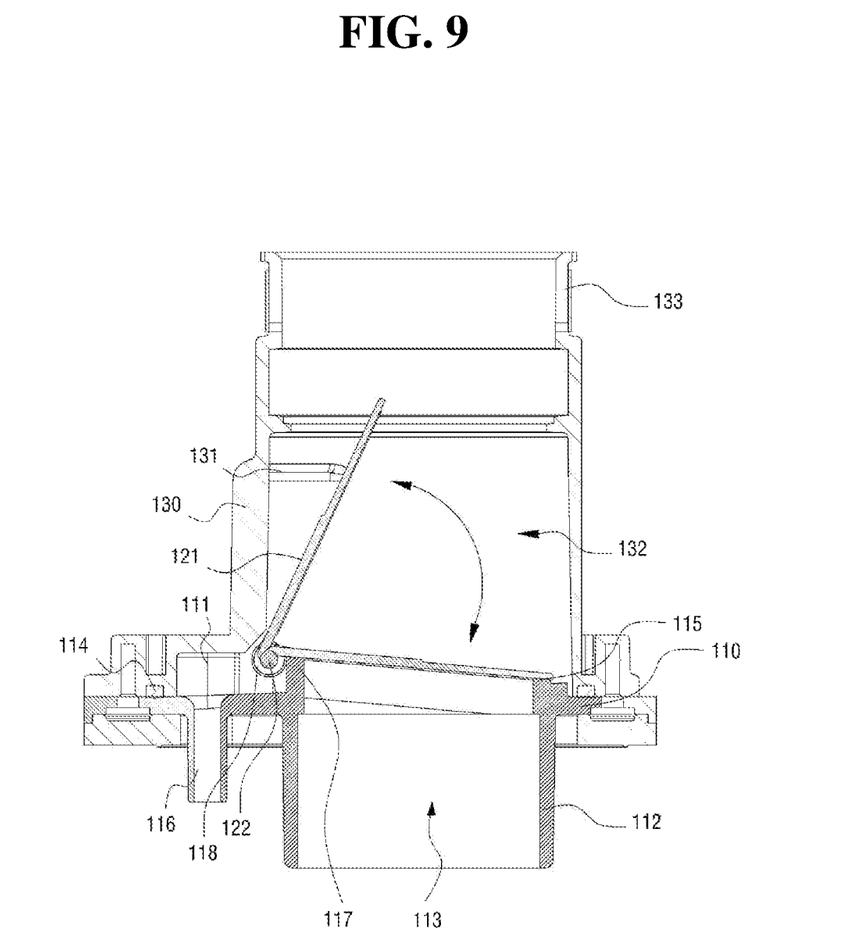
FIG. 9 is a magnified cross-sectional view of a major part of FIG. 8.

FIG. 6 is a perspective view illustrating the coupled state of the reverse flow prevention apparatus 100 for common exhaust flue according to the preferred embodiment of the present invention, FIG. 7 is an exploded perspective view of FIG. 6, FIG. 8 is a cross-sectional view taken along line A-A in FIG. 6, and FIG. 9 is a magnified cross-sectional view of a major part of FIG. 8.

With reference to FIGS. 6 to 9 respectively, a lower portion of the reverse flow prevention apparatus 100 for common exhaust flue according to a preferred embodiment of the present invention is coupled to the exhaust connection port 210 of the combustion apparatus 200. The reverse flow prevention apparatus 100 for common exhaust flue is provided to include a flange 110 configured to have a water collector 111 in the vicinity of an upper part of an exhaust hole 113, an opening and closing apparatus 120 placed at an upper side of the flange 110 to open and close the exhaust hole 113 according to a pressure, a body 130 coupled to an upper part of the flange 110 by interposing an airtight member 114 therebetween, and the common exhaust connection pipe 140 connected to the body 130 by a clamp 134 and having an upper end connected to the common exhaust flue 300.

Hereinafter, a configuration and an operation of the reverse flow prevention apparatus 100 for common exhaust flue having such a configuration according to the preferred embodiment of the present invention will be described in detail.

Firstly, the flange 110 includes a connection pipe 112 protruding in a downward direction at a lower part of the flange 110, and the exhaust hole 113 of a circular shape is vertically provided. A inclined protrusion 117 stepped higher than other part of the exhaust hole 113 and having an inclined end surface of a cylindrical shape is formed along a circumference of the exhaust hole 113. A hinge coupler 118 to which a hinge 122 of the opening and closing apparatus 120 is coupled is located at a higher inclined end surface of the protrusion 117. A distinguishing action of such a configuration will be described in detail below.

The water collector 111 being stepped lower is formed at an outward surrounding area of the inclined protrusion 117, and a discharge pipe 116 is formed downward at a part of the water collector 111. A bottom surface of the water collector 111 is inclined to facilitate a draining toward the discharge pipe 116.

A sealing portion 115 of an elastic material is fixedly installed at an upper center portion of the inclined protrusion 117.

The hinge 122 of the opening and closing apparatus 120 may be coupled to the hinge coupler 118, and an opening and closing member 121 of a circular plate shape integrally provided with the hinge 122 at one side thereof may rotate centering on the hinge 122.

While the opening and closing member 121 is closed, a lower edge thereof comes in contact with the sealing portion 115 protruding from an upper side of the inclined protrusion 117 such that it may be possible to prevent exhaust gas flowing reversely from the common exhaust flue 300 from flowing into the combustion apparatus 200. Particularly, a sealing ability between the sealing portion 115 of an elastic material and the opening and closing member 121 of a resin is more increased than that between plastics such that a reverse flow of the exhaust gas may be completely prevented.

Also, the opening and closing member 121 of the opening and closing apparatus 120 is inclined along the inclined end surface of the inclined protrusion 117 in a state that the opening and closing member 121 has been closed. Thus, when being on the opening and closing member 121, the condensate water flows along the inclined direction to the water collector 111 to be discharged to an outside through the discharge pipe 116. With such a configuration, it may be possible to prevent a phenomenon in which the opening and closing member 121 is not smoothly opened and closed due to an increase of weight and a remaining of foreign materials caused by the condensate water located at the opening and closing member 121.

Unlike a typical method of a vertical movement, the opening and closing member 121 is opened and closed by being rotated centering on the hinge 122, and an exhaust is performed by a rotation of the opening and closing member 121 in an upward direction due to an increase of an exhaust pressure of the combustion apparatus 200 when the combustion apparatus 200 coupled to a lower part of the opening and closing member 121 operates. At this point, since an area occupied by the opening and closing member 121 in an exhaust space is relatively small, a sufficiently wider exhaust space may be secured even though a pipe diameter of the body 130 is equal to that of the flange 110.

Therefore, a volume of the apparatus according to the present invention when the apparatus has been installed is less than that of the typical apparatus so that an installation may be easily implemented due to a decrease of interference with peripheral components. Also, a sufficient exhaust space may be provided to increase exhaust efficiency.

The body 130 is coupled to the upper part of the flange 110 to which the opening and closing apparatus 120 is rotatably coupled at the upper part thereof, by interposing the airtight member 114 between the body 130 and the flange 110.

The body 130 provides a spacing portion 132 in which the opening and closing member 121 is sufficiently rotated, and a stopper 131 capable of limiting a maximum opening state of the opening and closing member 121 is provided inside the body 130. The stopper 131 may have a structure horizontally protruding from a part of an inside wall of the body 130. When the opening and closing member 121 is upwardly rotated to be opened by a pressure, an end portion of the stopper 131 comes in contact with an upper surface of the opening and closing member 121 to limit a more upward rotation thereof.

Since both ends of the opening and closing member 121 may be tightly attached to an inner diameter of the body 130 to become a state not to be restored to a closing state due to the circular shape of the opening and closing member 121, when the opening and closing member 121 is pushed up close to verticality, an excessively upward rotation of the opening and closing member 121 may be prevented using the stopper 131.

A slit coupling portion 133 including silts, which are vertically formed at a part of the upper side of the body 130 to facilitate a coupling with the common exhaust connection pipe 140, is formed at the body 130. The common exhaust connection pipe 140 is tightly fixed by tightening the slit coupling portion 133 by the clamp 134 while being inserted into the slit coupling portion 133.

An upper end of the common exhaust connection pipe 140 is connected to the common exhaust flue 300 described above.

With such a configuration, when condensate water resulting from a condensation of vapor contained in exhaust gas discharged through the common exhaust flue 300 flows into the common exhaust connection pipe 140, the condensate water flows along wall surfaces of an inward side of the common exhaust connection pipe 140 and the body 130 into the water collector 111 provided at the flange 110. A part of the water collector 111 to which the discharge pipe 116 is connected is formed at a lowest position and thus the condensate water flows into the discharge pipe 116 to be discharged.

Therefore, the present invention may prevent the condensate water from flowing into the combustion apparatus 200 regardless of an opening state or a closing state of the opening and closing member 121.

As described above, although the present invention has been described in detail with reference to the preferred embodiment thereof, it is not limited thereto, and it should be understood that numerous other modifications can be implemented within the full range of the appended claims, the disclosure, and the accompanying drawings, and also such modifications will fall within the scope of the present invention.

The invention claimed is:

1. A reverse flow prevention apparatus for common exhaust flue, which is configured to collect exhaust gas of a plurality of combustion apparatuses, discharge the collected exhaust gas through a single common exhaust flue, and prevent a reverse flow of the exhaust gas from the single common exhaust flue to each of the combustion apparatuses, comprising:
    a flange coupled to an exhaust port of each of the combustion apparatuses;
    an opening and closing apparatus hinge-coupled to an upper part of the flange to be opened and closed by a pressure difference between a lower portion and an upper portion thereof; and
    a body coupled to the upper part of the flange so as to accommodate the opening and closing apparatus,
    wherein the reverse flow prevention apparatus is integrally coupled with an exhaust connection port of the combustion apparatuses, wherein the body of the reverse flow prevention apparatus is detachably coupled to a common exhaust connection pipe connected to the common exhaust flue, wherein the flange includes:
- a connection pipe coupled to the exhaust port of each of the combustion apparatuses;
- an inclined protrusion configured to form a circumference of an exhaust hole through which the exhaust gas of each of the combustion apparatuses passes, and protruding more than a surrounding area of the exhaust hole, wherein the inclined protrusion is inclined toward a first side;
- a water collector provided at the surrounding area of the inclined protrusion on a second side that is opposite to the first side;
- a discharge pipe connected to a part of the water collector to discharge condensate water collected at the water collector to an outside; and
- a hinge coupler configured to fix the opening and closing apparatus, and wherein the surrounding area of the exhaust hole includes an inclined surface that is inclined toward the second side to enable the condensate water to flow into the water collector.

2. The reverse flow prevention apparatus for common exhaust flue of claim 1, wherein a sealing portion made of an elastic material is coupled to an upper part of the inclined protrusion.

3. The reverse flow prevention apparatus for common exhaust flue of claim 1, wherein the water collector is configured to include an inclined bottom surface so as to facilitate a discharge of the collected condensate water through the discharge pipe.

4. The reverse flow prevention apparatus for common exhaust flue of claim 1, wherein the opening and closing apparatus includes:
- a hinge hinge-coupled to the hinge coupler; and
- an opening and closing member configured to have one side at which the hinge is provided, and to be vertically rotated about the hinge to open or close the inclined protrusion.

5. The reverse flow prevention apparatus for common exhaust flue of claim 4, wherein the body includes a stopper configured to determine a maximum rotational position of the opening and closing member when the opening and closing member is upwardly rotated.

6. The reverse flow prevention apparatus for common exhaust flue of claim 1, wherein the body includes:
- a slit coupling portion having a plurality of slits vertically provided at an upper part of the slit coupling portion; and
- a clamp configured to enable the common exhaust connection pipe to be tightly inserted and hold an outer circumference of the slit coupling portion to prevent the common exhaust connection pipe from being escaped.

7. A combustion apparatus comprising the reverse flow prevention apparatus for common exhaust flue according to claim 1.

* * * * *